US006557932B2

(12) United States Patent
Manders

(10) Patent No.: US 6,557,932 B2
(45) Date of Patent: May 6, 2003

(54) ROOF ASSEMBLY FOR A VEHICLE

(75) Inventor: Peter Christiaan Leonardus Johannes Manders, Horst (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/968,634

(22) Filed: Oct. 1, 2001

(65) Prior Publication Data
US 2002/0041115 A1 Apr. 11, 2002

(30) Foreign Application Priority Data

Oct. 4, 2000 (NL) .............................. 1016322

(51) Int. Cl.[7] .................................. B60J 7/057
(52) U.S. Cl. ................. 296/214; 296/223; 16/93 R
(58) Field of Search ................ 296/214, 223; 16/93 R

(56) References Cited

U.S. PATENT DOCUMENTS

| 2,434,711 A | | 1/1948 | Mobbs et al. ............ 296/137 |
| 3,053,581 A | * | 9/1962 | Werner ................... 16/93 R |
| 3,055,266 A | | 10/1962 | Werner ................... 16/93 R |
| 3,558,183 A | | 1/1971 | Sigmund ................. 296/137 |
| 4,890,880 A | | 1/1990 | Sakamoto ................ 296/214 |
| 4,936,623 A | | 6/1990 | Huyer ................... 296/220 |
| 5,906,412 A | | 5/1999 | Matsumura ............... 296/223 |
| 6,164,718 A | | 12/2000 | Stallfort ............... 296/222 |
| 6,364,406 B1 | * | 4/2002 | Hermsen et al. ......... 296/214 |
| 6,464,292 B1 | | 10/2002 | Manders ................. 296/214 |

FOREIGN PATENT DOCUMENTS

| DE | 2 234 852 | | 7/1972 | |
| EP | 0 338 614 A1 | | 10/1989 | |
| EP | 0 802 077 A1 | | 10/1997 | |
| EP | 0 956 988 A2 | | 11/1999 | |
| JP | 59-38126 | | 1/1984 | |
| JP | 59-202935 | | 11/1984 | |
| JP | 0246824 | * | 10/1990 | ............ 296/214 |
| JP | 2246824 | | 10/1990 | |
| JP | 10166866 | | 6/1998 | |
| JP | 10-166866 | * | 6/1998 | |
| WO | WO 99/55546 | | 4/1999 | |

OTHER PUBLICATIONS

U.S. patent application Ser. No. 09/829,878, filed Apr. 10, 2001.

* cited by examiner

Primary Examiner—Dennis H. Pedder
(74) Attorney, Agent, or Firm—Westman, Champlin & Kelly, P.A.; S. Koehler

(57) ABSTRACT

A roof assembly for a vehicle having an opening in its fixed roof has a stationary part to be fixed to the roof and a closure element supported by the stationary part. The closure element is slidably guided along guideways in the stationary part at its side edges by means of sliding shoes. The sliding shoes form part of a sliding shoe unit. The guideway comprises a flange having opposed sides, on which the sliding shoes engage. The sliding shoes of the sliding shoe units respectively engage one of the sides of the flange, and in that the sliding shoes engaging the opposed sides of the flange are so designed that they clamp the flange between them under spring pressure.

10 Claims, 4 Drawing Sheets

ROOF ASSEMBLY FOR A VEHICLE

BACKGROUND OF THE INVENTION

The present invention relates to a roof assembly having an opening in a fixed roof of a vehicle.

Such a roof assembly is known, for example from JP-A-10166866. Said roof assembly employs sliding shoe units, which comprise spring-loaded sliding shoes, which each engage round the flange of the guide rail. To this end, the sliding shoes are shaped as a horizontal "U".

SUMMARY OF THE INVENTION

The object of the invention is to provide a further improved roof assembly for a vehicle. The assembly includes a stationary part to be fixed to the roof. A plurality of guideways are provided in the stationary part and each guideway includes a flange with opposed sides. A closure element is supported by the stationary part and is slidably guided along the guideways. A plurality of sliding shoe units are coupled to the closure element and include first and second sliding shoes. The shoes engage opposite sides of the flange between the sliding shoes under spring pressure.

As a result of the fact that separate sliding shoes engage the opposed sides of the flange of the guide rail, in combination with the spring load (in a vertical direction), no play will occur between the sliding shoes and the flange. Furthermore it will be easy to compensate for tolerances, so that the sliding shoe unit is less critical in regard to production tolerances. It is possible thereby for a sliding shoe on one side of the flange to provide the vertical reference, while the sliding shoe on the other side mainly provides the spring action.

Advantageously, the sliding shoe unit comprises three sliding shoes, two of which engage one side of the flange while one engages the other side of the flange.

In this way each sliding shoe unit can slide along the flange without exhibiting a tendency to tilt, in particular if the first-mentioned sliding shoes engaging one side of the flange are positioned outwards of the second sliding shoe engaging the other side thereof.

In an embodiment which is advantageous with regard to production tolerances, each sliding shoe unit comprises a metal mounting element, and at least said second sliding shoe has been formed around a supporting portion of the mounting element by means of an injection molding process. Any tolerances in the supporting portion of the mounting element will be compensated by injection-molding the sliding shoe in the correct position thereon.

BRIEF DESCRIPTION OF THE DRAWINGS

The invention will now be explained in more detail with reference to the drawings, which schematically show an exemplary embodiment of the invention.

DETAILED DESCRIPTION OF THE ILLUSTRATIVE EMBODIMENTS

Figure 1:
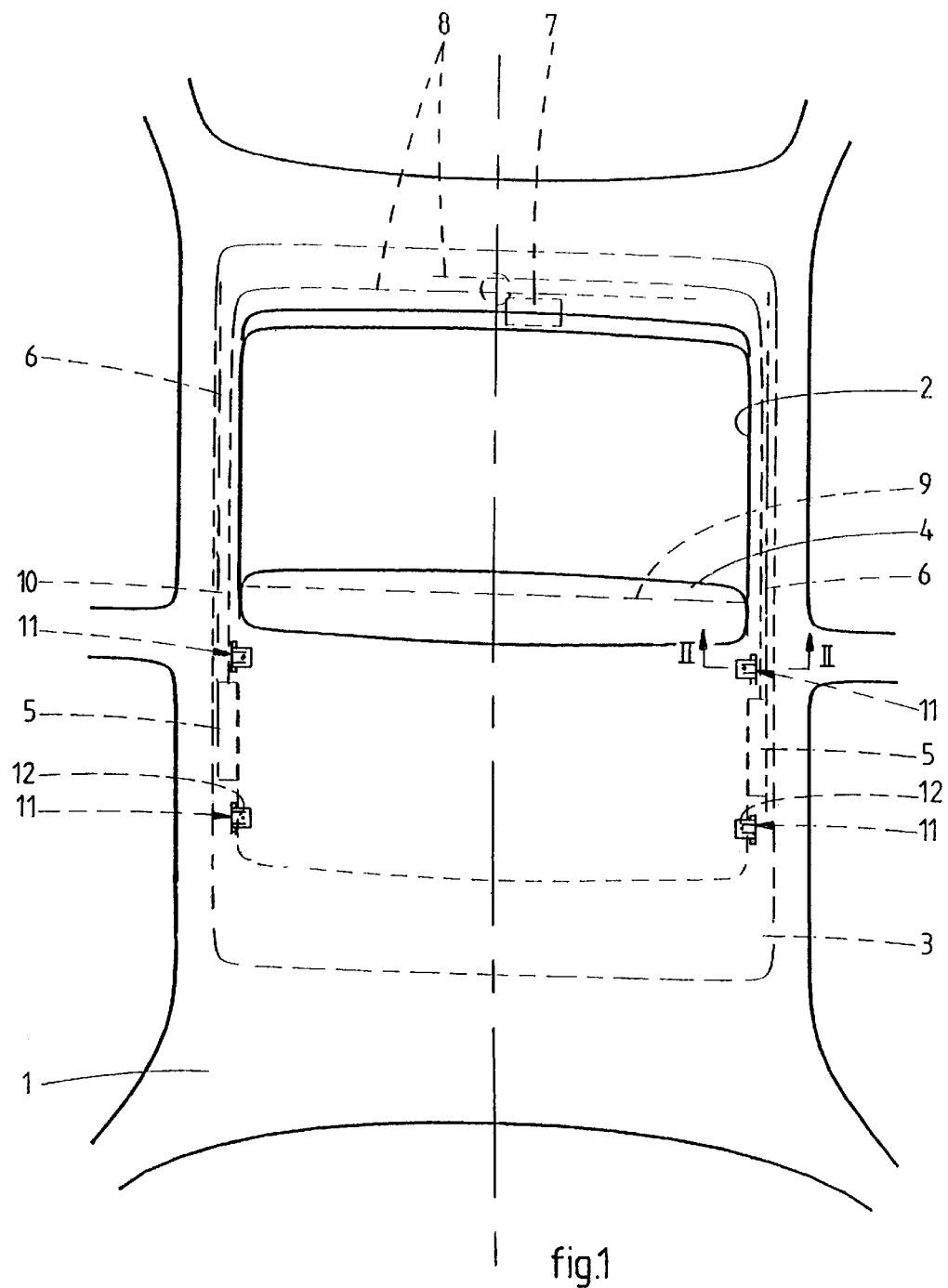
FIG. 1 is a very schematic top plan view of a vehicle roof fitted with the embodiment of the roof assembly according to the invention.

FIG. 1 shows the fixed roof of a motor vehicle, in this case a passenger car. Said fixed roof 1 is provided with an at least substantially rectangular roof opening 2 for the purpose of mounting an open roof construction or a roof assembly therein. The roof assembly comprises a stationary part, in this case a frame 3, which is fixed to the underside of the fixed roof 1 of the vehicle.

In the illustrated embodiment, the roof assembly is a so-called sliding roof or tilt-sliding roof, which comprises a panel 4 which is preferably transparent and which is more or less rigid in this embodiment. The panel 4 is capable of selectively closing the roof opening 2 or releasing it to a greater or lesser extent. Panel 4 is also laterally supported by operating mechanisms 5, which are slidably accommodated in guide rails 6. Guide rails 6 are mounted on frame 3 or form part thereof, and which extend in a longitudinal direction, parallel to each other, on either side of roof opening 2 and rearwards thereof. Operating mechanisms 5 can be moved synchronously in guide rails 6 and thus move the panel 4 not only in a longitudinal direction but also in a vertical direction. The operating mechanisms 5 are actuated from a driving device 7, such as an electric motor, for example via pull-push cables 8.

Besides panel 4, the roof assembly also includes a lower closure element, in this case in the form of a sun screen 9, which is slidably guided with its side edges with respect to guideways 10 of guide rails 6. Sun screen 9 can be moved forward and rearward manually or automatically, for example, or be moved together with panel 4. The guideways 10 for the sun screen 9 are flat flanges extending parallel to sun screen 9, that is, at least substantially horizontally.

Sun screen 9 is fitted with a number of sliding shoe units 11. Two sliding shoe units 11 are placed on each side edge of the sun screen 9 in this embodiment, in order to enable sliding movement of sun screen 9 along flanges 10.

Figure 2:
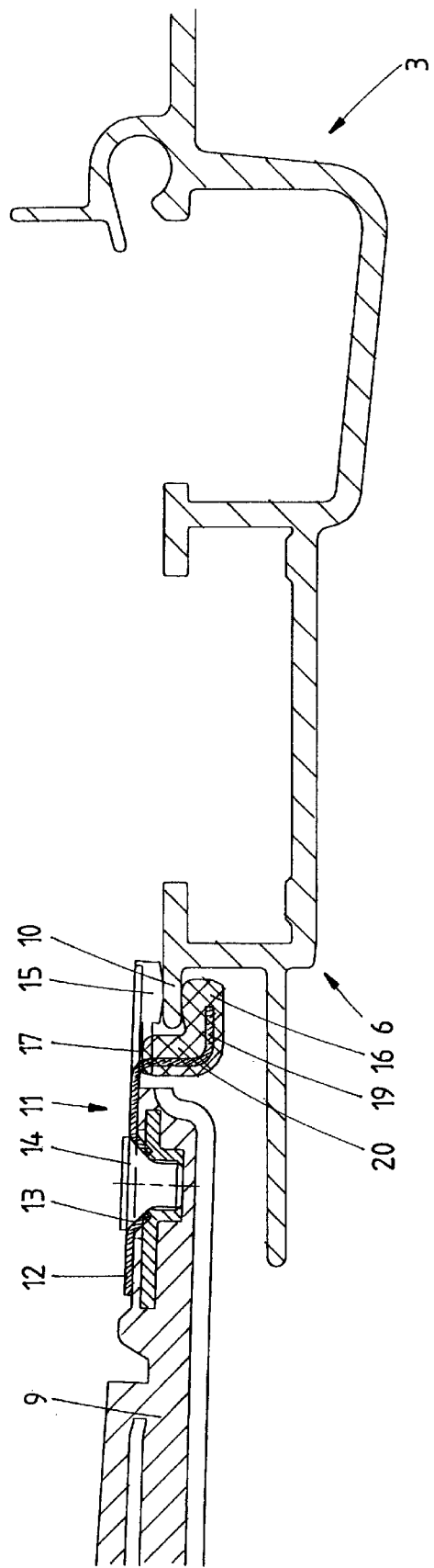
FIG. 2 is a larger-scale sectional view along line II—II in FIG. 1, wherein only the sun screen and the guide rail are shown for the sake of clarity.
Figure 3:
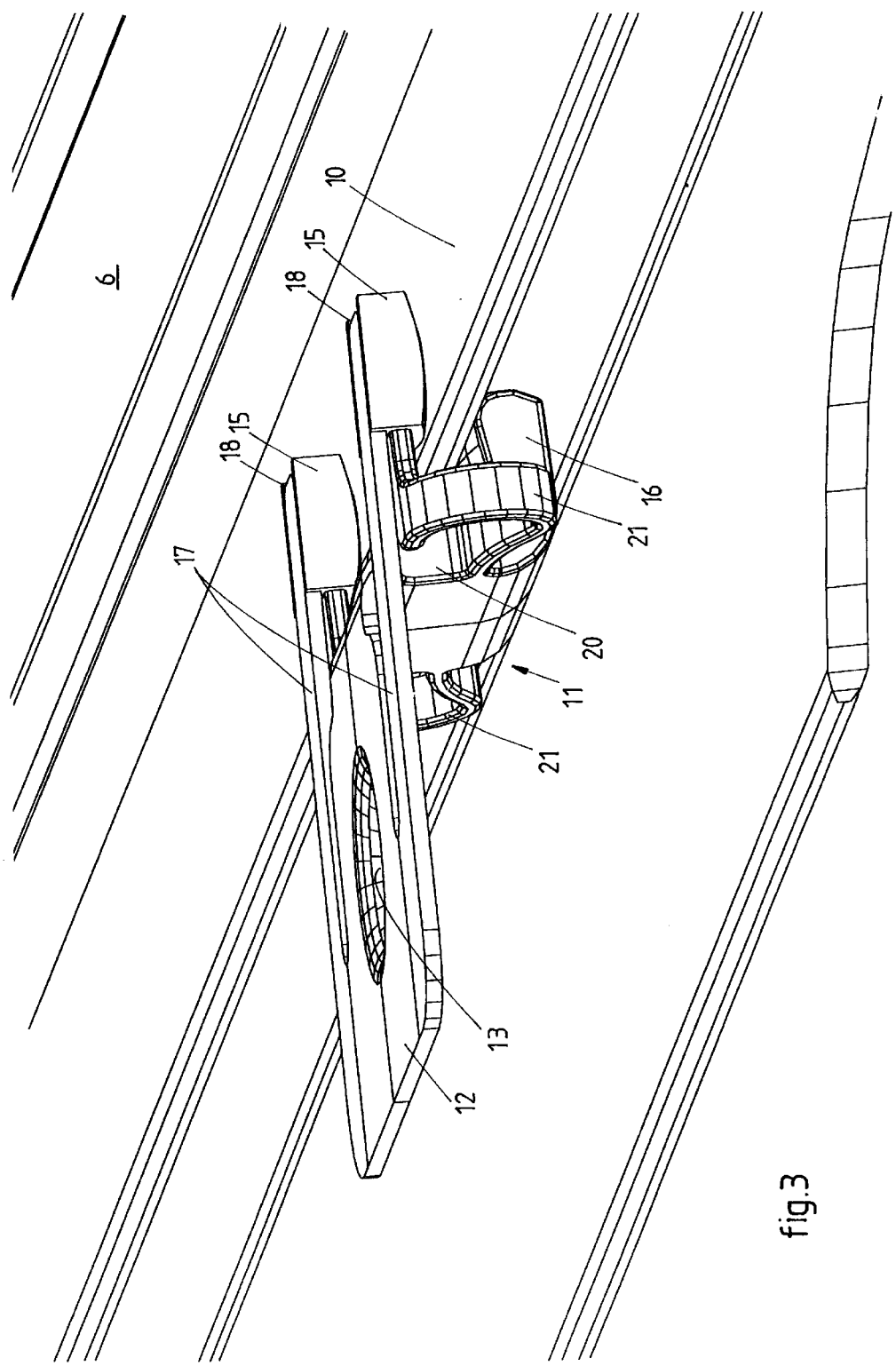
FIG. 3 is a larger-scale perspective view of a sliding shoe unit and the guide rail.
Figure 4:
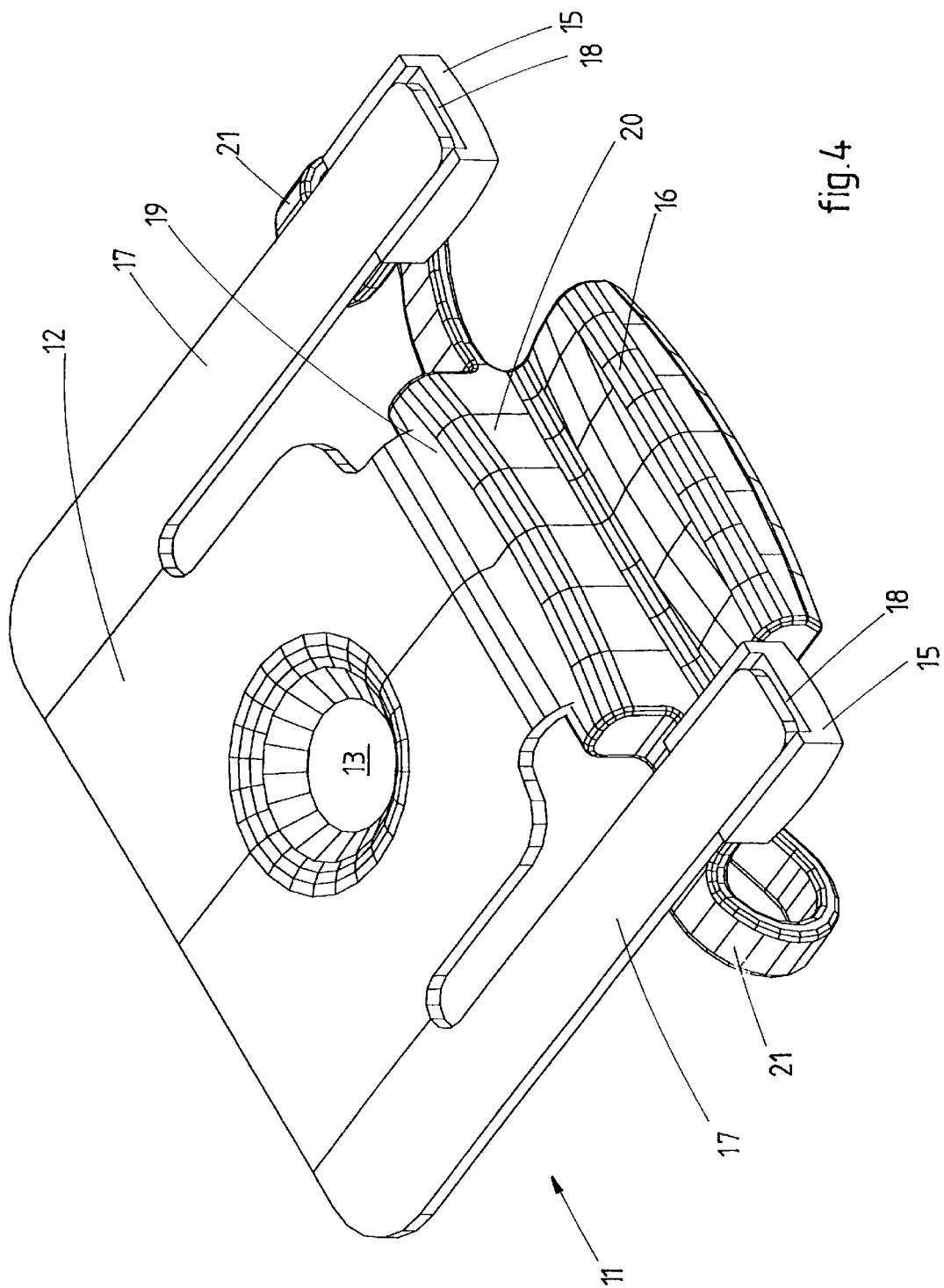
FIG. 4 is a perspective view of the sliding shoe unit of FIG. 3, seen from the other side.

FIGS. 2–4 show one of the sliding shoe units 11 in more detail. Each sliding shoe unit 11 comprises a mounting element 12, for example, cut out of metal, which is provided with a mounting hole 13 in a horizontal portion thereof. Mounting hole 13 allows the sliding shoe unit 11 to be fixed to the sun screen 9 by means of a screw 14 or other fastener. The mounting element 12 of the sliding shoe unit 11 furthermore functions to support sliding shoes 15, 16. As illustrated in this embodiment, there are two first sliding shoes 15 and one second sliding shoe 16.

First sliding shoes 15 are intended for engaging the upper side of flange 10, and they are supported by an associated arm 17. Arms 17 are integral with the mounting element 12 and extend outwards in a transverse direction, at least substantially parallel to flange 10 and sun screen 9, at least substantially horizontally in most cases. Arms 17, which are flat in a horizontal direction and which extend in a straight line, are arranged for springing movement in a direction at least substantially perpendicular to the respective sliding surface of flange 10, the upper side in this case. The desired spring force of the arms 17 can be varied by a suitable selection of the length, the width and the thickness thereof and also of the material that is used. The first sliding shoes 15 are fixed to the underside of the associated arms 17, for example by being injection-molded thereon or by clamping the arms 17 in a gutter or groove 18 formed on the upper side of the first sliding shoe 15. The side of the first sliding shoe 15 that faces towards flange 10 is rounded in two directions, so that the sliding shoes 15 are only in engagement with a central portion of flange 10.

The second sliding shoe 16 of each sliding shoe unit 11 is positioned centrally between the two spaced-apart sliding shoes 15, seen in a longitudinal direction, while the upper side of the second sliding shoe 16 is spaced from the under side of first sliding shoes 15 in a vertical direction by such a distance that the sliding shoes 15 and 16 engage the two sides of the flange 10 with some bias. A suitable selection of said bias and of the material for the sliding shoes 15 and 16 makes it possible to exert the desired friction on the sun screen 9, and thus effect the desired braking action, when the sun screen is being moved, as a result of which an even movement of the sun screen 9 can be realized.

The second sliding shoe 16 has been formed around a downwardly curved supporting portion 19 of the mounting element 12 by means of an injection-molding process. The second sliding shoe 16 furthermore includes an upright portion 20, which is capable of abutment against the edge of the flange 10 that faces towards the sun screen 9, so that the sun screen 9 can be guided in a transverse direction as well. The spring force of the supporting portion 19 of sliding shoe unit 11 enables the second sliding shoe 16 to exert some spring force in a transverse direction as well. The first sliding shoes 15 and the second sliding shoe 16 are preferably formed integrally in one injection-molding process. In this embodiment, the first sliding shoes 15 are connected to the second sliding shoe 16 via a connecting part 21. The injection-molding process can thereby take place in the form in which the sliding shoe unit 11 will finally be used, but it is also possible to mold the connecting part 21 as a more or less straight part and subsequently move the first sliding shoes 15 to their final position under the arms 17 by bending the easily yielding connecting part 21.

Due to its construction and its method of manufacture, the sliding shoe unit 11 as shown is less critical with regard to production tolerances, in particular with regard to the metal mounting element 12, on which the sliding shoes 15 and 16 are formed by means of an injection-molding process. The single flange 10 of the guide rails 6 thereby makes it easier for the sliding shoes to engage and to effect the required friction and braking action between the guide rails 6 and the sliding shoe unit 11.

Although the present invention has been described with reference to preferred embodiments, workers skilled in the art will recognize that changes may be made in form and detail without departing from the spirit and scope of the invention.

What is claimed is:

1. A roof assembly for a vehicle having an opening in its fixed roof, comprising:
    a stationary part to be fixed to the roof the stationary part having a plurality of guideways, each guideway having a flange with opposed sides;
    a closure element supported by said stationary part, the closure element slidably guided along the plurality of guideways in the stationary part; and
    a plurality of sliding shoe units coupled to the closure element, each sliding shoe unit comprising first and second sliding shoes, the sliding shoes engaging opposite sides of the flange and clamping the flange between the sliding shoes under spring pressure, wherein said sliding shoes are rounded on a side that faces towards the flange, while the flange is flat and extends at least substantially parallel to the closure element.

2. A roof assembly for a vehicle having an opening in its fixed roof, comprising:
    a stationary part to be fixed to the roof the stationary part having a plurality of guideways, each guideway having a flange with opposed sides;
    a closure element supported by said stationary part, the closure element slidably guided along the plurality of guideways in the stationary part; and
    a plurality of sliding shoe units coupled to the closure element, each sliding shoe unit comprising first and second sliding shoes, the sliding shoes engaging opposite sides of the flange and clamping the flange between the sliding shoes under spring pressure, wherein each sliding shoe unit comprises a third sliding shoe, and the first and third sliding shoes engage one side of the flange, while the second sliding shoe engages the other side of the flange.

3. The roof assembly according to claim 2, wherein the first and third sliding shoes are spaced apart from each other and the second sliding shoe is located between the first and third shoes.

4. The roof assembly according to claim 2, wherein the first and third sliding shoes are provided on resilient metal arms, extending transversely and substantially horizontally in an outward direction and spring in a direction substantially perpendicular to a respective sliding face of the flange, the arms further being flat in a horizontal direction.

5. The roof assembly according to claim 1, wherein each sliding shoe unit comprises a metal mounting element, and wherein at least said second sliding shoe has been formed around a supporting portion of the mounting element by an injection molding process.

6. The roof assembly according to claim 1, wherein the sliding shoes of each sliding shoe unit are integral and are interconnected by yielding connecting parts.

7. The roof assembly according to claim 4, wherein said first and third sliding shoes are each provided with a groove, in which the associated metal arm is secured.

8. The roof assembly according to claim 1, wherein at least one of said sliding shoes includes an upright portion, which abuts against said guide rail and against an edge of the flange that faces towards the closure element.

9. The roof assembly according to claim 1, wherein each sliding shoe unit is fixed to the closure element by a fastener.

10. The roof assembly according to claim 1, wherein said closure element comprises a sun screen, which is capable of movement under an upper closure element supported by the stationary part.

* * * * *